US012675810B2

(12) United States Patent
Mcdaniel et al.

(10) Patent No.: US 12,675,810 B2
(45) Date of Patent: Jul. 7, 2026

(54) SYSTEMS AND METHODS FOR PERSONALIZED SIZING CODES

(71) Applicant: Capital One Services, LLC, McLean, VA (US)

(72) Inventors: Christopher Mcdaniel, Glen Allen, VA (US); Michael Anthony Young, Jr., Henrico, VA (US); Matthew Louis Nowak, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 477 days.

(21) Appl. No.: 18/194,022

(22) Filed: Mar. 31, 2023

(65) Prior Publication Data

US 2024/0330998 A1 Oct. 3, 2024

(51) Int. Cl.
*G06Q 30/00* (2023.01)
*G06Q 30/0601* (2023.01)

(52) U.S. Cl.
CPC ..... *G06Q 30/0613* (2013.01); *G06Q 30/0631* (2013.01)

(58) Field of Classification Search
CPC ........................ G06Q 30/0613; G06Q 30/0631
See application file for complete search history.

(56) References Cited

U.S. PATENT DOCUMENTS

| | | | |
|---|---|---|---|
| 8,762,292 B2 | 6/2014 | Bright et al. | |
| 9,251,591 B2 | 2/2016 | Song et al. | |
| 11,080,918 B2 | 8/2021 | Chen et al. | |
| 2019/0073335 A1* | 3/2019 | Foley .................... G06V 40/10 | |

OTHER PUBLICATIONS

F. Menczer, W. N. Street and A. E. Monge, "Adaptive assistants for customized E-shopping," in IEEE Intelligent Systems, vol. 17, No. 6, pp. 12-19, Nov.-Dec. 2002, doi: 10.1109/MIS.2002.1134357. (Year: 2002).*

* cited by examiner

*Primary Examiner* — Anand Loharikar
(74) *Attorney, Agent, or Firm* — Bookoff McAndrews, PLLC

(57) ABSTRACT
Systems and methods for outputting a size code include receiving a plurality of size nodes for a plurality of users, the plurality of size nodes comprising incoming size nodes or outgoing size nodes for one or more items, generating a plurality of size profiles based on the plurality of size nodes, wherein the plurality of size profiles each correlate a size for each item entity to each other item entity of the respective item entities, receiving first user size nodes for a first user, matching the first user to a first size profile of the plurality of size profiles based on the first user size nodes, receiving a first item corresponding to a first item entity of the item entities, identifying, at the size engine, a size code for the first item based on the first size profile, and outputting the size code.

20 Claims, 7 Drawing Sheets

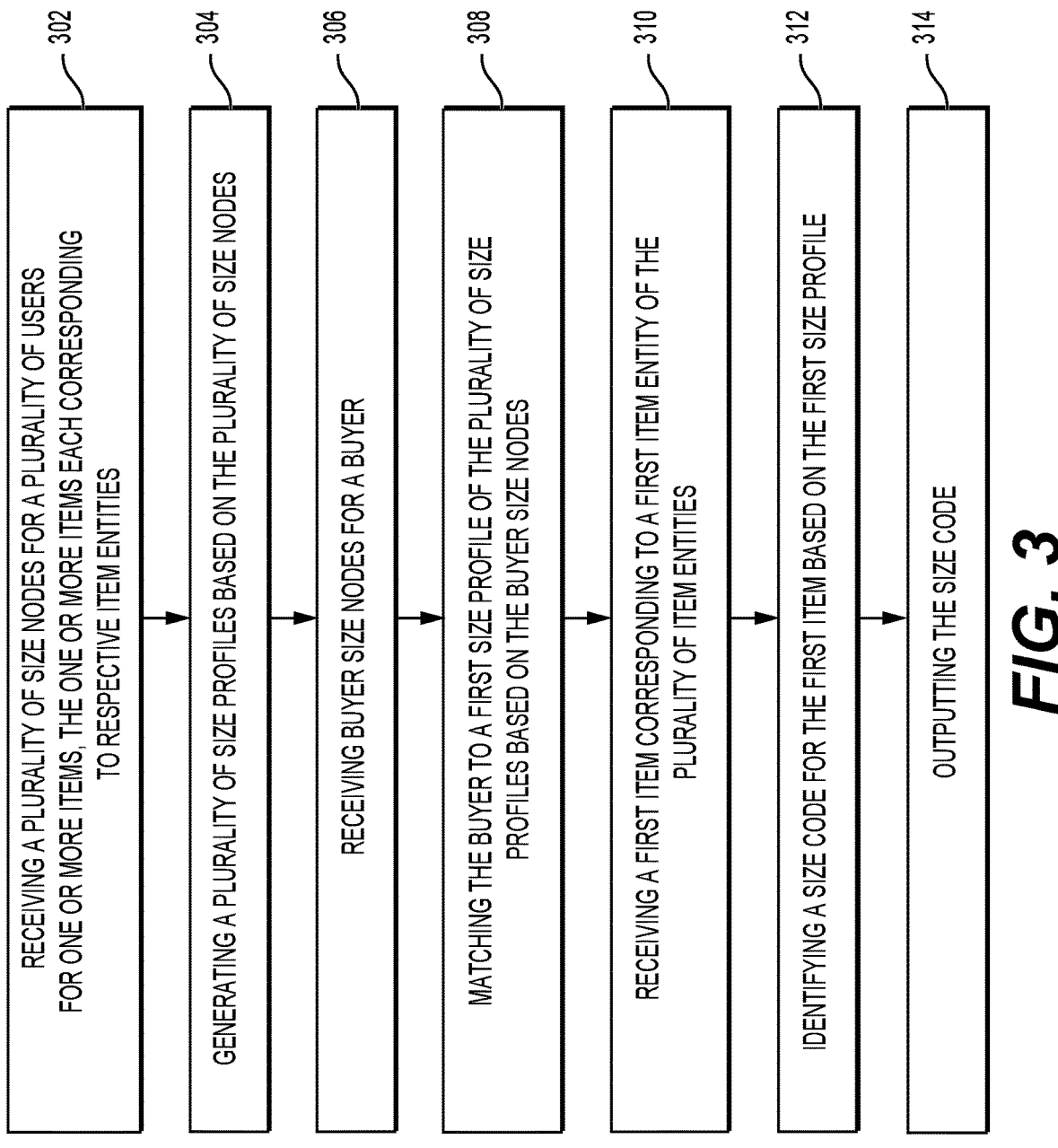

300

RECEIVING A PLURALITY OF SIZE NODES FOR A PLURALITY OF USERS FOR ONE OR MORE ITEMS, THE ONE OR MORE ITEMS EACH CORRESPONDING TO RESPECTIVE ITEM ENTITIES — 302

GENERATING A PLURALITY OF SIZE PROFILES BASED ON THE PLURALITY OF SIZE NODES — 304

RECEIVING BUYER SIZE NODES FOR A BUYER — 306

MATCHING THE BUYER TO A FIRST SIZE PROFILE OF THE PLURALITY OF SIZE PROFILES BASED ON THE BUYER SIZE NODES — 308

RECEIVING A FIRST ITEM CORRESPONDING TO A FIRST ITEM ENTITY OF THE PLURALITY OF ITEM ENTITIES — 310

IDENTIFYING A SIZE CODE FOR THE FIRST ITEM BASED ON THE FIRST SIZE PROFILE — 312

OUTPUTTING THE SIZE CODE — 314

*FIG. 3*

SYSTEMS AND METHODS FOR PERSONALIZED SIZING CODES

TECHNICAL FIELD

Various embodiments of the present disclosure relate generally to generating personalized sizing codes, and more particularly to, systems and methods for generating personalized sizing codes based on sizing information from a cohort of users.

BACKGROUND

Sizing information for consumer items (e.g., garments) is often particular to a given user's preferences and/or dimensions. Item entities (e.g., garment brands) categorize items based on various sizing schema. Such sizing schema is often particular to each item entity such that the sizing schema for a first item entity may defer from the sizing schema for a second entity. Accordingly, a size (e.g., a "medium" size) for a first item entity may defer from the same size for a second item entity. Pre-determined correlations between multiple item entities are often rigid and not specific to a given user. Such pre-determined correlations often suffer from the same limitations as differences in sizes between item entities.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for generating size codes for users.

[To be updated after approval]

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 depicts a flowchart of an exemplary method for outputting a size code, according to one or more embodiments.

DETAILED DESCRIPTION OF EMBODIMENTS

Figure 1:
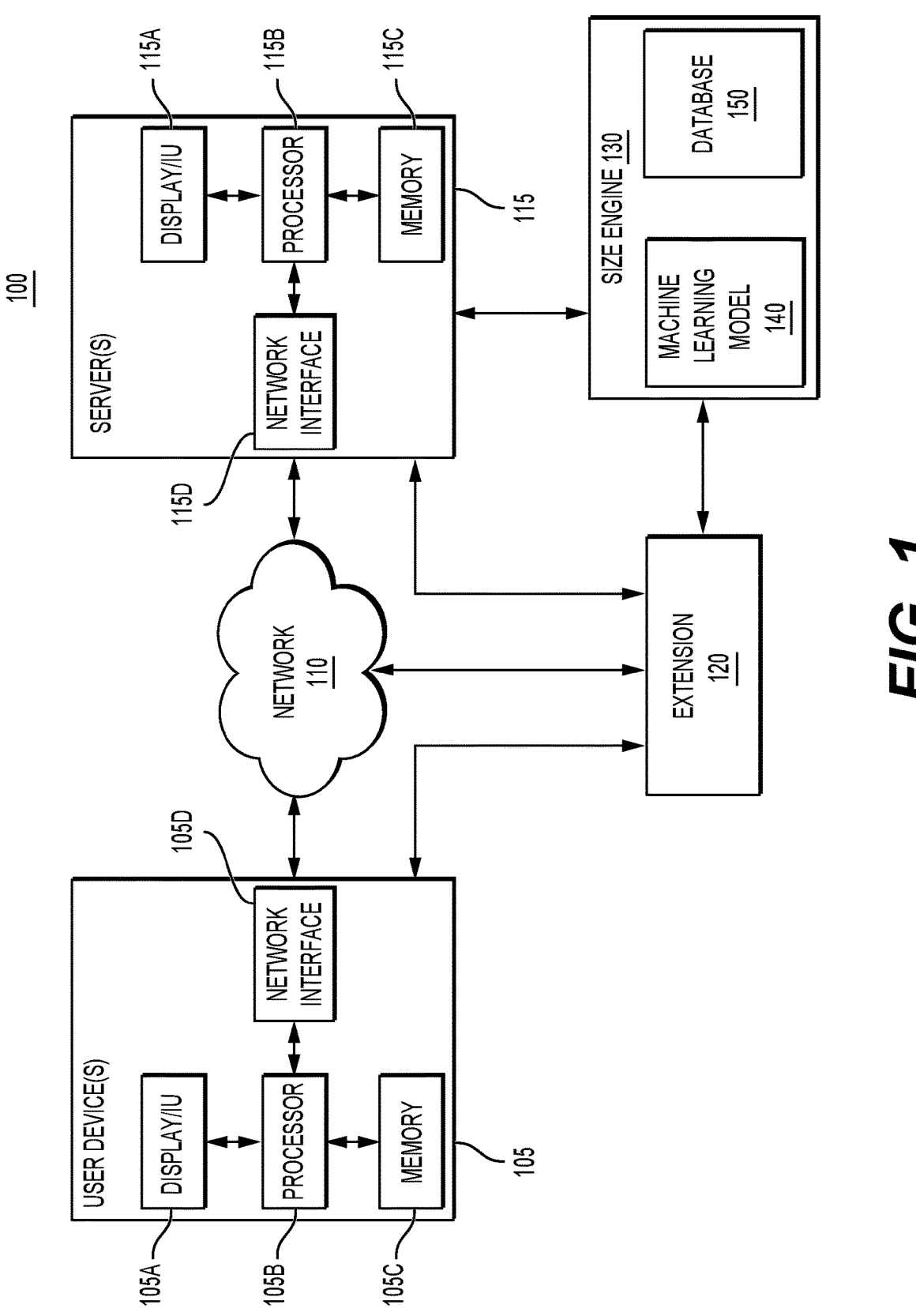
FIG. 1 depicts an exemplary environment for implementing a size engine, according to one or more embodiments.

According to certain aspects of the disclosure, methods and systems are disclosed for generating size codes for a user for one or more items and/or item entities.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

According to certain aspects of the disclosure, methods and systems are disclosed for e.g., identifying a size code for an individual user based on cohort data (e.g., size nodes a plurality of users, as disclosed herein). A size code for an individual user (e.g., a buyer) may be determined based on identifying a size profile for the individual user. The size profile for the individual user may be selected from a plurality of size profiles generated based on cohort data. The selected size profile for the individual user may be selected based on matching size nodes for the individual user with the size profile most closely associated with the size nodes. However, conventional techniques may not be suitable. For example, conventional techniques may not associate size nodes for an individual user with size profiles generated based on cohort data. Accordingly, improvements in technology relating to providing individualized size codes are needed.

As will be discussed in more detail below, in various embodiments, systems and methods are described for using, for example, machine learning to generate size profiles and match an individual user to a given size profile. By training one or more machine learning models, e.g., via supervised or semi-supervised learning, to learn associations between training data and ground truth data, the trained machine learning models may be used to generate size profiles and/or match a size profile to an individual user.

As discussed herein, an extension may be or include code, applications, software, pointers, algorithms, or the like that are configured to add features and/or functions to one or more of a portals such as web browser, an application, a software, a marketplace, or the like. An extension may be generated using web-based technologies such as, but not limited to, HTML, CSS, JavaScript, Java, etc. An extension may be implemented using one or more Application Programming Interfaces (APIs) that connects an extension to a web browser, an application, a software, a marketplace, or the like. The one or more APIs may allow communication and functionality between an extension and one or more item entity point-of-sale portals.

An extension may be associated with a user device, a web browser (e.g., accessible via one or more user devices), an application, or the like. For example, an extension associated with a web browser may have access to a plurality of point-of-sale portals for a respective plurality of item entities. Accordingly, a user may access a first website and a second website using the web browser. The extension associated with the web browser may communicate with both the first website and the second website in the background, based on user provided permissions.

An extension may be configured to communicate with a given portal (e.g., a website) via one or more APIs. The extension may receive information associated with a given portal by accessing the code associated with the portal, by accessing containers associated with the portal, or the like. For example, an extension may detect that a user is purchasing an item based on code or containers for a website indicating an add-to-cart or checkout action. The extension may be configured to extract information associated with the add-to-cart or checkout action, such as one or more items associated with the add-to-cart or checkout action.

A point-of-sale portal may be associated with a given item entity. The point-of-sale portal may be specific to the given item entity or may be specific to an online store or marketplace where a plurality of items for a plurality of item entities can be purchased. A point-of-sale portal may be and/or may be accessed via a platform such as one or more of a Uniform Resource Locator (URL), a domain, a device application, a marketplace, or the like. An extension may communicate with a point-of-sale portal associated with a platform via one or more APIs, as disclosed herein. Point-of-sale portals are generally described herein as platforms for simplicity.

As discussed herein, an item may be any consumer good or product that has one or more variations (e.g., as distinguished by stock keeping units (SKUs), Universal Product Codes (UPCs), International Standard Book Numbers (ISBNs), European Article Numbers (EANs), etc.) for the same product. An item may be a garment, a wearable product, an accessory, or the like.

As discussed herein, a size node may be any information related to the properties of a given item. A size node may be specific to a user or a group of users. A size node may be an item size, an item fit, an item feedback, an incoming purchase, an outgoing feedback for a respective item or item entity, a re-buy item size for a given item, or the like.

An item size may be a value or tier associated with a given item and may be based on a global schema or an item entity schema. An item size may be expressed as a numerical value, an alphanumeric value, a tier, a term, or the like. An item fit may be a category (e.g., slim-fit, regular fit, casual fit, skinny fit, etc.) or other indication of a type of fitting for an item. An item fit may be expressed as a numerical value, an alphanumeric value, a tier, a term, or the like. An item feedback may be based on a user input, may be deduced based on a user action (e.g., a purchase, return, exchange, etc.), or the like.

An outgoing size node may be an exchange or return and/or feedback associated with a reason for a return or exchange and may be provided based on user input or user action. A null outgoing marker may be generated when no negative feedback, no return, and no exchange is made such that a null outgoing marker is a positive indication associated with an item. A re-buy may be a re-purchase of a previously returned item (e.g., having a different item size, fit, etc.). An incoming size node may correspond to a purchase. Accordingly, an incoming size node may include information about a purchased item including its respective size, fit, feedback, or the like. An outgoing size node may include information about a returned or exchanged item including its size, fit, feedback, time to return or exchange, re-buy information, or the like. A size node may be a single value, a set of values, a matrix, a relational database entry, or the like and may include one or more relationships based on a given item.

As disclosed herein, a size code may be a size, a measurement, a dimension, or any applicable value, tier, or indicator that distinguishes between item property variations. A size code may be based on an item entity schema such that a size code generated based on the subject matter disclosed herein may be specific to a given item entity (e.g., a brand). The given item entity may be the item entity for which a user may purchase a given item from. Accordingly, a size code may be a size recommendation for that given item for the given item entity. A size code may be expressed in an engine format (e.g., as determined by a size engine). The engine format may be converted to an item entity specific schema format. For example, an extension, as disclosed herein, may receive a size code in an engine format and may covert the size code in the engine format to an item entity specific schema format.

For clarification, a size node may be known or extracted information related to a user (e.g., a training user) or a buyer whereas a size code may be a size, fit, indicator, or other recommendation generated for a given buyer.

As discussed herein, a size profile matched to a given byer may be selected from a plurality of size profiles generated in accordance with the techniques disclosed herein. Each size profile may include and/or be based on a group of item and/or item entities and a relationship of item properties (e.g., sizes, fits, etc.) between the group of item entities. The relationship of item properties may be unique to each size profile such that the item property relationships between a first item or item entity and a second item or item entity in a first size profile may be different than the item property relationships between the first item or item entity and the second item or item entity in a second size profile. Each size profile may include and/or be based on a unique variation of size nodes for the group of item entities, as further discussed herein.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value. In this disclosure, the term "higher" refers to more, greater than, or up. In this disclosure, the term "lower" refers to below, less than, or down.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as a vector based model, linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

While several of the examples herein involve a given machine learning model it should be understood that techniques according to this disclosure may be adapted to any suitable type of machine learning. It should also be understood that the examples above are illustrative only. The techniques and technologies of this disclosure may be adapted to any suitable activity.

According to implementations of the disclosed subject matter, a buyer (e.g., a user) may be provided a recommended size code (e.g., "medium", "twelve," "My Size", etc.) for a given item (e.g., an article of clothing, garment, wearable product, etc. that a buyer may be in the process of purchasing) based on the buyer's preferences. The buyer's preferences may be determined based on historical purchases and/or user input and may be based on relationships between different size nodes (e.g., sizes, fits, feedback, etc.) for respective different items. The different items may be sold by one or more respective item entities (e.g., brands). Accordingly, the implementations disclosed herein may provide a size recommendation (a size code) for a buyer based on the buyer's determined preferences rather than relationships between sizes across a given entity or across multiple entities.

For example, a first buyer may be provided a size medium recommendation for a t-shirt from a first brand based on the first buyer's determined preferences (e.g., based on the first buyer's size nodes, as discussed herein). A second buyer having the same physical dimensions as the first buyer may be provided a size large recommendation for the same t-shirt from the same first brand, based on the second buyer's determined preferences. Accordingly, implementations disclosed herein may generate buyer preference specific size recommendations rather than recommendations based on a comparison of variance in sizes or fits across different item entities.

According to implementations disclosed herein, a plurality of size nodes (e.g., an item size, an item fit, an item feedback, an outgoing feedback for a respective item or item entity, a re-buy item size for a given item) for a plurality of users (e.g., a cohort of users) may be received. The size nodes for the plurality of users may be received via an extension or other application (generally referred to an "extension" hereafter). The extension may monitor purchase, return, feedback, and like activity of the plurality of users via respective point-of-sale portal associated platforms (e.g., via browsers, applications, mobile applications, software, etc.). The extension may automatically receive and record such monitored information based on the plurality of users respective interactions with their respective platform. The plurality of size nodes may each provide information about properties (e.g., size, fit, feedback, purchase information, return information, etc.) associated with respective items.

Based on the plurality of size nodes for a plurality of training users (e.g., a cohort of users), a plurality of size profiles may be generated (e.g., using a vector based machine learning model). The plurality of size profiles may include, for example, permutations of overlapping or correlated size nodes. According to an implementation, the plurality of size profiles may include a size profile for each available permutation of each available size node or sets of size nodes.

As a simplified example, a first size profile may correlate fits across a Brand A, Brand B, and Brand C, as provided by a first set of training users from a cohort of users. The first size profile may indicate that the first set of training users preferred a size medium from Brand A, a size medium from Brand B, and a size large from Brand C. A second size profile may correlate fits across the same three brands, as provided by a second set of training users from the cohort of users. The second size profile may indicate that the second set of training users preferred a size medium from Brand A, a size small from Brand B, and a size medium from Brand C. According to this example, the first size profile based on Brand A, Brand B, and Brand C may have different size correlations than the second size profile based on the same brands, based on the respective training user preferences (as determined based on respective size nodes).

Size nodes for a first buyer (e.g., a user for whom a size code may be generated, as further discussed herein) may be received. As discussed herein, the size nodes for the first buyer may include, for example, item sizes, item fits, item feedback, outgoing feedback for a respective item or item entity, re-buy item sizes for a given item, or the like. The size nodes for the first buyer may be received via an extension or other application (generally referred to an "extension" hereafter). The extension may monitor purchase, return, feedback, and like activity of the user via a platform (e.g., via a browser, an application, mobile application, software, etc.). The extension may automatically receive and record such monitored information based on a buyer's interaction with the platform.

According to an implementation, certain purchases, returns, feedback, or the like may be excluded from the side nodes associated with a buyer. Such exclusions may be based on user input (e.g., a buyer may provide such exclusions) or may be identified by a machine learning model. For example, buyer may make purchases for one or more individuals other than the buyer and, accordingly, such purchases may be excluded from the buyer's size nodes. A machine learning model may be trained to identify such exclusions based on, for example, historical size nodes, user information, or the like.

Based on the size nodes of the first buyer, the first buyer may be matched to a size profile. Continuing the simplified example above, the first buyer may purchase a first item in size medium from Brand A and a second item in size medium from Brand B. The first buyer may keep the first item (size medium from Brand A) and/or may provide feedback indicating a favorable fit associated with the first item. The extension may record the purchase of the first item and that the first buyer kept the first item and/or provided the favorable feedback for the first item as size nodes associated with the first buyer. The first buyer may exchange the second item (size medium from Brand B) for a size small of the second item. The extension may record the exchange of the second item for a size small as additional or updated size nodes associated with the first buyer.

Based on the first buyer's size nodes (purchase of the first item in size medium, favorable feedback for the first item and size, purchase of the second item in size medium, and/or exchange of the second item for size small), a machine learning model may match the first buyer to the second size profile. As discussed above, the second size profile may be based on a set of training users that preferred a size medium from Brand A, a size small from Brand B, and a size medium from Brand C. For clarification, although the example first size profile included correlations between a size medium from Brand A and a size medium from Brand B (corresponding to the first buyer's original size nodes), the buyer may be matched to the second profile (a size medium from Brand A and a size small from Brand B) based on the first buyer's subsequent or updated size node indicating the exchange of a size medium to a size small item from Brand B.

A first target item corresponding to a first item entity (e.g., a brand) may be received (e.g., from the first buyer). A size code may be output for the first target item from the first item entity based on a matched size profile. Continuing the example above, the first buyer may select a clothing item from Brand C for purchase. Based on associating the first buyer with the second size profile above, a size code "medium" may be output to the user for the item from Brand C. In this example, the second size profile associated with the user indicates that b associated with the second size profile prefer size medium from Brand C.

Although the simplified example provided above generally describes size profiles based on item entities (e.g., Brand A, Brand B, and Brand C), it will be understood that size profiles may be based on any items or size nodes, as discussed herein. For example, size profiles may be based on specific items, fits, etc. As further discussed herein, a machine learning model may be used to generate the size profiles. The same machine learning model, component of the machine learning model, and/or a different machine learning model may correlate a buyer with a given size profile based on a match confidence. Accordingly, although the simplified example provided above included matching the first buyer to the size medium from Brand A and the size small from Brand B for simplicity, a machine learning model may match a buyer to a more complex size profile (e.g., based on relationships between size nodes from training users) if a given size profile matches with the buyer by a threshold match confidence.

FIG. 1 depicts an exemplary system 100 for accessing a data source using one or more user devices 105, according to one or more embodiments, and which may be used with the techniques presented herein. The system 100 may include one or more user device(s) 105 (hereinafter "user device 105" for ease of reference), a network 110, and one or more server(s) 115 (hereinafter "server 115" for ease of reference). While only one of each of user device 105 and server 115 is depicted, the disclosure is not so limited. Rather, two or more of user devices 105 and/or two or more servers 115 may be implemented in accordance with the techniques disclosed herein.

User device 105 may be used to, for example, access a data source or platform (e.g., an application, a website, a server, etc.). User device 105 may exchange data with server 115 over network 110. A user may gain access to user device 105 and/or one or more data sources via user device 105 using an authentication mechanism. The authentication mechanism may include a multi-step authentication, a biometric authentication, or a password strength. A multi-step authentication may be, for example, a two-step authentication that requires a first set of credentials (e.g., a log-in and password) and a secondary verification (e.g., a code sent to an email account). A biometric authentication may be, for example, a facial recognition, a fingerprint recognition, a retina recognition, a fluid test, a breath test, or any other applicable biometric verification.

The user device 105 and the server 115 may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below.

An extension 120 may receive information (e.g., based on monitoring) from user device 105 and/or provide information (e.g., size codes) to user device 105 (e.g., a user device associated with a buyer). Extension 120 may also communicate with server 115 and/or a size engine 130 directly or via network 110.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S). The memory 115C may also store one or more instances of a machine learning model (e.g., secure machine learning model, risk machine learning model, sanitation model etc.) as well as one or more model states. The display/UI 115A may be a touch screen or a display with other input systems (e.g., mouse, keyboard, etc.) for an operator of the server 115 to control the functions of the server 115. The network interface 115D may be a TCP/IP network interface for, e.g., Ethernet or wireless communications with the network 110.

The user device 105 may include a display/UI 105A, a processor 105B, a memory 105C, and/or a network interface 105D. The user device 105 may be a mobile device, such as a cell phone, a tablet, etc. The user device 105 may execute, by the processor 105B, an operating system (OS), a machine learning training component, or the like. One or more components shown in FIG. 1 may generate or may cause to be generated one or more graphic user interfaces (GUIs) based on instructions/information stored in the memory 105C and/or 115C, instructions/information received from the server 115, and/or the one or more user devices 105. The GUIs may be mobile application interfaces or browser user interfaces, for example.

In various embodiments, the network 110 may be a wide area network ("WAN"), a local area network ("LAN"), personal area network ("PAN"), or the like. In some embodiments, electronic network 110 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

Size engine 130 may be configured to generate size profiles and match buyers (e.g., users looking to make a purchase) to the generated size profiles. Size engine 130 may generate size profiles based on size nodes received via extension 120. Size engine 130 may generate size profiles using machine learning model 140 which may be trained and/or may generate machine learning outputs via communication with database 150. Size engine 130 may communicate with any component of system 100 (e.g., via network 110).

As discussed in further detail below, the one or more components of exemplary system 100 may use one or more of (i) generate, store, train, or use a machine learning model or its applicable components or attributes such as notes, model states, or the like. The exemplary system 100 or one of its components may include a machine learning model and/or instructions associated with the machine learning model, e.g., instructions for generating a machine learning model, training the machine learning model, using the machine learning model, etc. The exemplary system 100 or one of its components may include instructions for retrieving data, adjusting data, e.g., based on the output of the machine learning model, and/or operating a display to output data, e.g., as adjusted based on the machine learning model. The exemplary system 100 or one of its components may include, provide, and/or generate training data.

In some embodiments, a system or device other than the components shown in exemplary system 100 may be used to generate and/or train the machine learning model. For example, such a system may include instructions for generating the machine learning model, the training data and ground truth, and/or instructions for training the machine learning model. A resulting trained machine learning model may then be provided to exemplary system 100 or one of its components. The machine learning model may be stored in any applicable location such as in memory 115C or memory 105C, in a location other than system 100 in operable communication with system 100, or the like.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable. Alternatively or in addition, unsupervised learning and/or semi-supervised learning may be used to train a machine learning model.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between training data (e.g., secure user data) and ground truth data, such that the trained machine learning model is configured to determine an output in response to the input data based on the learned associations.

In various embodiments, the variables of a machine learning model may be interrelated in any suitable arrangement in order to generate the output. For example, in some embodiments, the machine learning model may include image-processing architecture that is configured to identify, isolate, and/or extract features, geometry, and/or structure. For example, the machine learning model may include one or more vector based models or networks (e.g., convolutional neural networks ("CNN")) configured to identify features in the data, and may include further architecture, e.g., a connected layer, neural network, etc., configured to determine a relationship between the identified features in order to determine a location in the data.

In some instances, different samples of training data and/or input data may not be independent. Thus, in some embodiments, the machine learning model may be configured to account for and/or determine relationships between multiple samples.

For example, in some embodiments, the machine learning models described herein (e.g., a secure machine learning model, a risk machine learning model, a sanitization machine learning model, etc.) may include a CNN or Recurrent Neural Network ("RNN"). Generally, RNNs are a class of feed-forward neural networks that may be well adapted to processing a sequence of inputs. In some embodiments, the machine learning model may include a Long Short Term Memory ("LSTM") model and/or Sequence to Sequence ("Seq2Seq") model. An LSTM model may be configured to generate an output from a sample that takes at least some previous samples and/or outputs into account. A Seq2Seq model may be configured to, for example, receive a sequence of non-optical in vivo images as input, and generate a sequence of locations.

Although depicted as separate components in FIG. 1, it should be understood that a component or portion of a component in the exemplary system 100 may, in some embodiments, be integrated with or incorporated into one or more other components. For example, a portion of the server 115 may be integrated into the user device 105 or the like. In another example, the server 115 may be integrated in a data storage system. In some embodiments, operations or aspects of one or more of the components discussed above may be distributed amongst one or more other components. Any suitable arrangement and/or integration of the various systems and devices of the exemplary system 100 may be used.

Further aspects of machine learning models and/or how they may be utilized are described herein. In the following disclosure, various acts may be performed or executed by a component from FIG. 1, such as the server 115, the user device 105, or components thereof. However, it should be understood that in various embodiments, various other components of the exemplary system 100 discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

As applied herein, one or more machine learning states may correspond to weights, layer configurations, variables, or the like that can be used with a machine learning model. A machine learning state may be a numerical value or may be a relationship that can be used by a machine learning model to generate an output.

Figure 2:
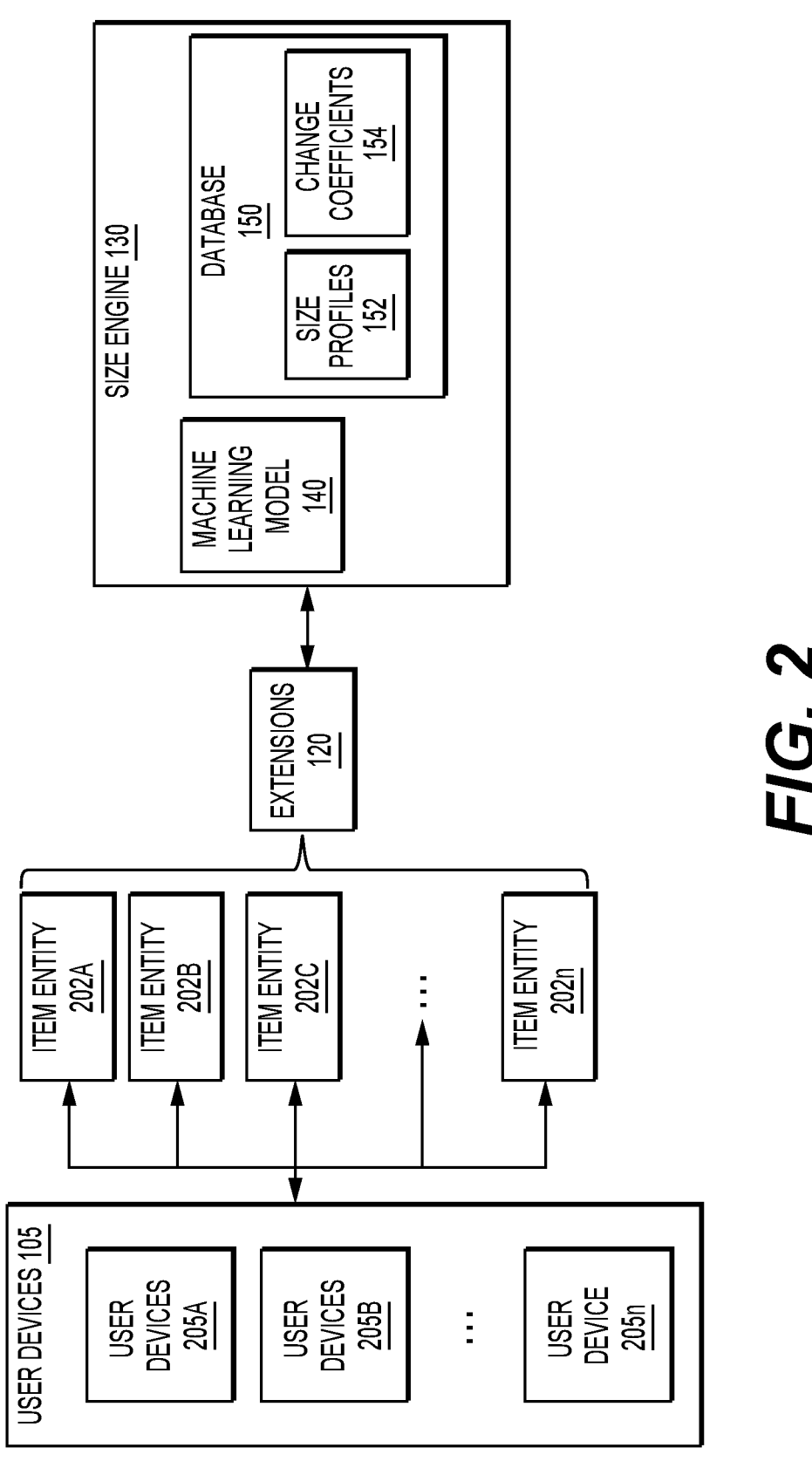
FIG. 2 depicts an exemplary flow diagram for implementing a size engine, according to one or more embodiments.

FIG. 2 depicts an exemplary system diagram 200 for generating size codes based on size profiles, as discussed herein. Size nodes for a plurality of training users may be received from user devices 105 (e.g., user devices 205A, 205B . . . 205n) corresponding to training users. As discussed herein, respective extensions 120 may monitor activity associated with incoming and outgoing size nodes (e.g., purchase activity, return activity, exchange activity, feedback, etc.). Extensions 120 may operate on user devices 105 or may be connected and/or communicate with user devices 105. Based on the monitored activity, the respective extensions 120 may receive information related to various sources such as item entity 202A, item entity 202B, item entity 202C . . . item entity 202n.

The size nodes for the plurality of training users may be stored (e.g., at server 115 or database 150 of FIG. 1) and may be used to generate size profiles (e.g., by machine learning model 140. The size profiles may be stored at size profile component 152. Size engine 130 may output size codes based on the size profiles stored at size profile component 152 and/or based on change coefficients stored at change coefficient component 154, as further discussed herein.

FIG. 3 shows flowchart 300 for outputting size codes for a given buyer. At step 302, a plurality of size nodes for a plurality of users (e.g., training users) may be received. As discussed herein, the size nodes for the plurality of users may be associated with respective items. The respective items may be associated with respective item entities that sell or otherwise provide the respective items.

The size nodes may be received based on the plurality of training users performing item actions associated with the respective items and/or item entities. The item actions may include purchases, returns, exchanges, feedback, or the like and may be used to generate the plurality of size nodes received at step 302. Extensions 120 may monitor interactions associated with the item actions (e.g., at point-of-sale portals) and may store the interactions at server 115 and/or database 150. Alternatively, extensions 120 may generate size nodes based on the monitored interactions and may store the size nodes at server 115 and/or database 150.

For example, a first training user may use user device 205B of FIG. 2 to purchase a size large slim fit first article from Brand A and a size medium relaxed fit second article from Brand B. A respective extension 120 associated with user device 205B may monitor the purchases and generate respective size nodes. The first training user may provide feedback that the second article is too loose. Based on the feedback, an additional size node may be generated and/or a generated respective size node may be updated to reflect a negative association between the first training user and the second article and/or the relaxed fit associated with the second article.

At step 304, a plurality of size profiles may be generated based on the plurality of size nodes received at step 302. The plurality of size profiles may be generated such that a size profile is generated for each distinct set of overlapping or correlated size nodes. Accordingly, a unique size profile may be generated for each set of size nodes with overlapping or correlated (e.g., up to a size profile threshold) preferences. Overlapping or correlated preferences may include identical or similar preferences (e.g., sizes, fits, properties, etc., that match or substantially match across item entities and/or items).

Figure 4:
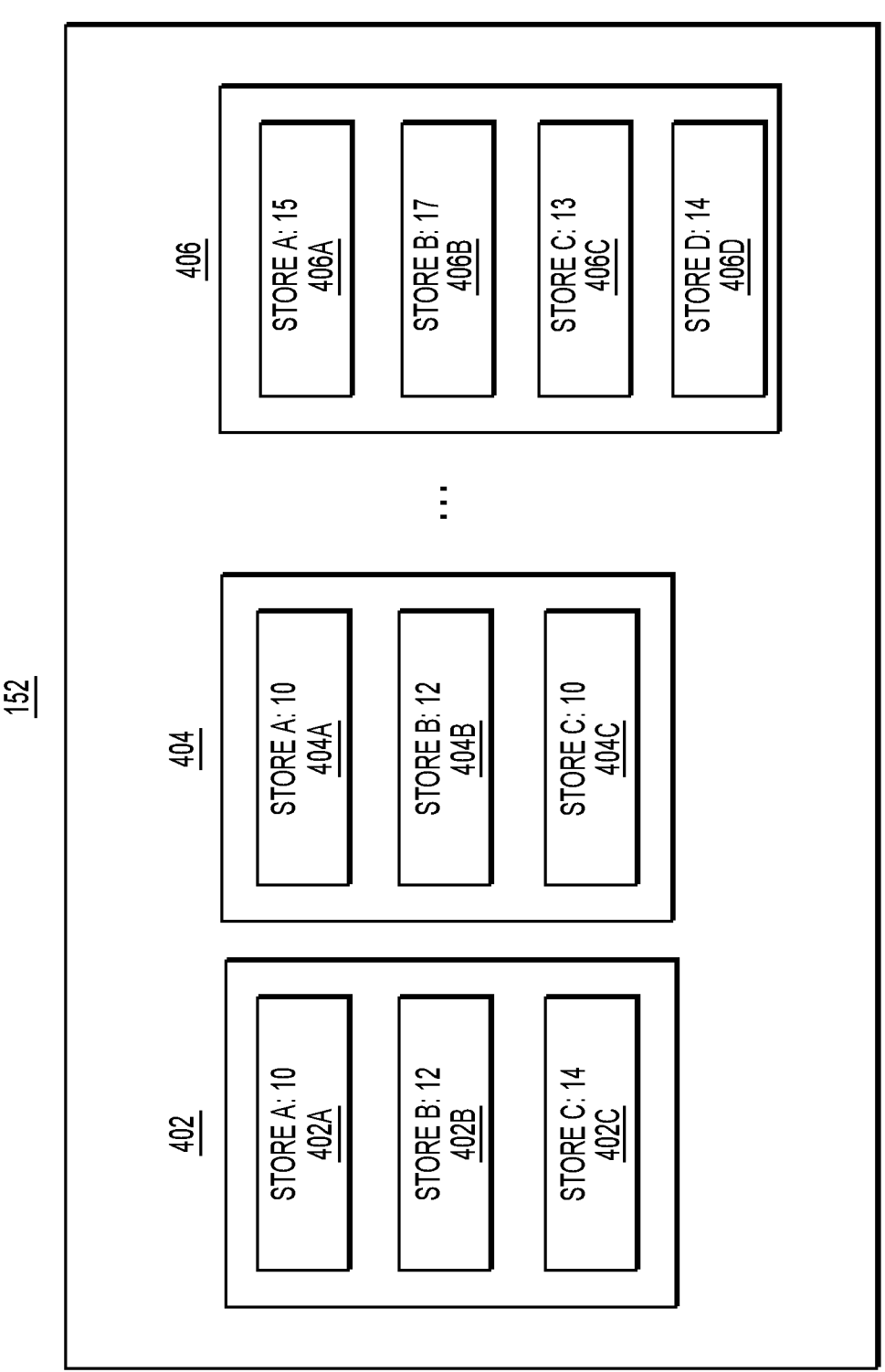
FIG. 4 depicts a diagram for implementing size profiles, according to one or more embodiments.

FIG. 4 shows an example size profile component 152 as discussed in reference to FIG. 2. The example size profile component 152 may include a first size profile 402, a second size profile 404, a third size profile 406, and a number of additional size profiles (not shown). As a simplified example, in reference to FIG. 4, a first size profile 402 may be generated based on a set (e.g., one or more) of size nodes that indicate a first branch 402A corresponding to a size ten for a first type of item from Store A, a second branch 402B corresponding to a size twelve for a second type of item (e.g., a same or different type of item than the first item) from Store B, and a third branch 402C corresponding to a size fourteen for a third type of item (e.g., a same or different type of item than the first item and/or second item) from Store C. A second size profile 404 may be generated based on a second set of size nodes that indicate a first branch 404A corresponding to a size ten for the first type of item from Store A, second branch 404B corresponding to a size twelve for the second type of item from Store B, and a third branch 404C corresponding to a size ten for the third type of item from Store C.

According to an implementation, a different size profile may be generated if a size profile threshold difference would exist between an existing size profile and a new size profile. The size profile threshold may be determined by a machine learning model based on sets of size nodes and/or relationships indicated by sets of size nodes. The size profile threshold may be based on variance in size nodes and/or sets of size nodes and may change based on additional size nodes that are used to train (e.g., retrain) a machine learning model. In the simplified example provided in reference to FIG. 4, it may be determined that the first size profile 402 being based on a size fourteen for the third type of item from Store C meets the size profile threshold difference from the second size profile 404, based on the second size profile 404 being based on a size ten for the third type of item from Store C (a difference of four sizes). However, for example, if the second set of size nodes included a size thirteen for the third type of item from Store C (only one size difference from the first set of size nodes including the size fourteen for the third item), then the size profile threshold may not be met and the second size profile 404 may not be generated.

At step 306 of flowchart 300 of FIG. 3, one or more size nodes for a given buyer may be received. As discussed herein, the size nodes for the buyer may be associated with respective items purchased, exchanged, or returned by the buyer, otherwise related to the buyer, or may be based on inputs (e.g., direct or indirect feedback) provided by the buyer. For example, a buyer may provide inputs via extension 120, via an interface, in response to a survey, or the like. Alternatively, or in addition, a transaction history of the buyer may be received (e.g., may be uploaded by the buyer, may be received based on access granted by the buyer, etc.). The size nodes for the buyer may be extracted from the transaction history. The respective items may be associated with respective item entities that sell or otherwise provide the respective items.

The buyer may perform item actions associated with the respective items. The item actions may include purchases, returns, exchanges, feedback, or the like and may be used to generate the plurality of nodes received at step 306. Extensions 120 associated with the buyer may monitor interactions associated with the item actions and may store the interactions at server 115 and/or database 150. Alternatively, extensions 120 and/or another component (e.g., of system 100) may generate size nodes based on the monitored interactions and may store the size nodes at server 115 and/or database 150.

For example, the buyer may use user device 205A of FIG. 2 to purchase a size medium slim fit first article from Brand A and a size small regular fit second article from Brand B. A respective extension 120 associated with user device 205A may monitor the purchases and generate respective size nodes. The buyer may provide feedback that the second article is too tight. Based on the feedback, an additional size node may be generated and/or a generated respective size node may be updated to reflect a negative association between the buyer and/or first article and the second article and/or the regular fit associated with the second article.

At step 308, the buyer may be matched to a first size profile of the plurality of size profiles generated at step 304, based on the buyer size nodes received at step 306. The first size profile may be matched based on a machine learning output indicating the first size profile as a match for the buyer size nodes. The buyer size nodes may be provided as an input to the machine learning model and, based on the buyer size nodes, the machine learning model may identify the first size profile that most closely matches the relationships indicated by the buyer size nodes.

The machine learning model may output the first size profile based on one or more relationships indicated by the buyer size nodes. As an example, the machine learning model may determine an overlap and/or correlation between items and/or item properties (e.g., item sizes, item fits, item types, etc.) included in the buyer size nodes and items and/or item properties included in each or a subset of the plurality of size profiles. Alternatively, or in addition, the machine learning model may determine an overlap and/or correlation between the items and/or item entities included in the buyer size nodes and items and/or item entities included in each or a subset of the plurality of size profiles. Alternatively, or in addition, the machine learning model may determine an overlap and/or correlation between the items and/or item entities within a threshold change coefficient of the items and/or item entities included in each or a subset of the plurality of size profiles. Change coefficients may be stored at change coefficient component 154 and are further discussed herein. Alternatively, or in addition, the machine learning model may determine an overlap and/or correlation between the relationships between different items and/or item entities (e.g., similarities between sizes, similarity between fits, etc., across two or more items or item entities) included in the buyer size nodes in comparison to each or a subset of the plurality of size profiles. Alternatively, or in addition, the machine learning model may determine a trend associated with changes in the buyer size nodes (e.g., over a period of time) and predict changes to the buyer size nodes. The machine learning model may identify the first user profile based on the predicted changes to the buyer size nodes and an overlap and/or correlation between the predicted changes and items and/or item entities included in each or a subset of the plurality of size profiles.

According to implementations disclosed herein, the one or more machine learning models disclosed herein may be trained based on historical or simulated training user preferences (e.g., historical or simulated training user size nodes), based on tagged or simulated size profiles, based on historical or simulated buyer preferences (e.g., historical or simulated buyer size nodes), or the like, or a combination thereof.

According to an implementation, the machine learning model may match a buyer to a size profile having a highest correlation score between the buyer size nodes and the size profile. For example, buyer size nodes may indicate a preference for a size ten first item from Store A, a size 12 second item from Store B, and a size thirteen third item from Store C. Accordingly, size profile 402 may have a high correlation score (e.g., 90) based on the difference between the buyer size nodes and size profile 402 being one size (relative to branch 402C's size fourteen compared to size thirteen indicated by the buyer size nodes). Size profile 404 may have a lower correlation score (e.g., 80) relative to size profile 402 based on the buyer size nodes and size profile 404 having a difference of three sizes (relative to branch 404C's size ten compared to size thirteen indicated by the buyer size nodes).

According to an implementation, a size profile may only be considered for a match if a minimum correlation score for a matching size profile is met. As another example, in reference to FIG. 4, buyer size nodes may indicate a preference for a size ten first item from Store A, a size twelve second item from Store B, and a size twelve third item from Store C. Accordingly, both size profile 402 and size profile 404 may have a high correlation score (e.g., 85) based on the difference between the buyer size nodes and size profiles 402 and 404 being two sizes (e.g., relative to branch 402C's size fourteen compared to the size twelve indicate by the buyer size nodes and relative to branch 404C's size ten compared to the size twelve indicate by the buyer size nodes). The high correlation score (e.g., 85) may meet a minimum correlation score (e.g., 75) and the machine learning model may select one of the size profiles 402 or 404 based on one or more other factors (e.g., additional preferences not shown in FIG. 4, a trend, etc.).

As shown in FIG. 4, size profile 406 may be generated based on a set of size nodes that indicate a first branch 406A corresponding to a size fifteen for the first type of item from Store A, a second branch 406B corresponding to a size seventeen for the second type of item from Store B, a third branch 406C corresponding to a size thirteen for the third type of item from Store C, and a fourth branch 406D corresponding to a size fourteen for a fourth type of item from Store D. Accordingly, based on a difference of five sizes relative to branch 406A, a difference of five sizes relative to branch 406B, and a difference of two sizes relative to branch 406C, size profile 406 may have a low correlation score (e.g., 50) based on the buyer size nodes. Accordingly, if the minimum correlation score is, for example, 75, then the machine learning model may disqualify size profile 406 from being a match for the buyer.

According to an implementation, if no available size profiles (e.g., stored at size profile component 152) meet the minimum correlation score, then a new size profile based on the buyer's size nodes may be generated.

At step 310, a first item corresponding to a first item entity of the plurality of entities may be received. The first item may be identified by extension 120 associated with a buyer's user device (e.g., based on monitoring item actions). For example, the buyer may access an item page associated with the first item on a platform, may add the first item to a cart, may add the first item to a wish list, may request a size code, and/or the like, or a combination thereof. According to an implementation, one or more items including the first item may be viewed or accessed by the buyer via a platform.

Based on the user viewing or accessing the one or more items, metadata associated with the one or more items may be cashed or otherwise provided to size engine 130 (e.g., via extension 120).

At step 312, a size code for the first item received at step 310 may be identified based on the first size matched to the buyer at step 308. Size engine 130 may provide the first item as an input to a machine learning model (e.g., the machine learning model used to generate the size profiles, the machine learning model used to match the buyer with first size profile, and/or a different machine learning model). The machine learning model may output a size code for the first item based one or more relationships between the first item and the data included in the first size profile. For example, the machine learning model may identify an overlap or correlation between item entities included in the first size profile and the item entity associated with the first item. Alternatively, or in addition, the machine learning model may identify an overlap or correlation between items or item categories included in the first size profile and the first item and/or an item category associated with the first item.

According to an example, in reference to FIG. 4, the first size profile matched with the buyer at step 308 may be size profile 402. At step 310, the buyer may select an item having the same item type as the second item from Store B. Based on the matched profile being size profile 402 and based on the second item and Store B being included in the size profile 402, a size code associated with size twelve may be identified at step 312.

According to an implementation, a first item received at step 310 may not be included in the first size profile matched at step 308. In this scenario, the machine learning model may apply a change coefficient to determine a size code for the first item received at step 310. The change coefficient may be determined based on the first size profile matched at step 308 and/or one or more other size profiles. The change coefficient may be a numerical value, a ratio, a percentage, or the like. The change coefficient may be based on a difference between the first item and one or more closet matching items included in the matched profile. For example, the matched size profile matched at step 308 may include the tank top from Store B having a size twelve (size profile 402, branch 402B). The first item received at step 310 may be a t-shirt from Store B. Based on an analysis of the plurality of size profiles, the machine learning model may determine that the size difference between a tank top relative to a t-shirt is plus one size (or represents a ratio of +1⁄12). This analysis may be buyer specific such that only those size profiles that meet a minimum correlation score are analyzed when determining the correlation score. Accordingly, the machine learning model may output a size code of size thirteen (e.g., size twelve plus the ratio 1⁄12) based on branch 402B indicating a size twelve for tank tops and the change coefficient indicating the plus one (or ratio +1⁄12) size for t-shirts, relative to tank tops, for the buyer.

According to an implementation, a first store (e.g., Store D) associated with the first item received at step 310 may not be included in the first size profile matched at step 308. In this scenario, the machine learning model may apply a change coefficient to determine a size code for the first item received at step 310. The change coefficient may be determined based on the first size profile matched at step 308 and/or one or more other size profiles. The change coefficient may be based on a difference between the store D associated with first item and one or more closet matching stores included in the matched profile. For example, the matched size profile matched at step 308 may include a tank top from Store B having a size twelve (size profile 402, branch 402B). The first item received at step 310 may be a tank top from Store D. Based on an analysis of the plurality of size profiles, the machine learning model may determine that the size difference between Store B and Store D is plus two sizes (or a ratio of +2/12). This analysis may be buyer specific such that only those size profiles that meet a minimum correlation score are analyzed when determining the correlation score. Accordingly, the machine learning model may output a size code of size fourteen (e.g., size twelve +2/12) based on branch 402B indicating a size twelve for tank tops and the change coefficient indicating the plus two sizes, relative to store D, for the buyer.

According to an implementation, a first store (e.g., Store E) associated with the first item received at step 310 may not be included in any of the plurality of size profiles generated at step 304. In this scenario, the machine learning model may determine a change coefficient associated with Store E. For example, the size engine 130, using the machine learning model, may determine the change coefficient associated with Store E and/or items associated with Store E based on an updated size node associated with the buyer indicating that a tank top having a size thirteen is a good fit for the buyer. The change coefficient for Store E may be correlated with one or more other stores included in the first size profile. For example, the buyer may be matched with size profile 402. The change coefficient may be determined based on a difference between Store E's size thirteen for a tank top and one or more of the stores in size profile 402. For example, size profile 402's branch 402B may be for a tank top having size twelve. Accordingly, the change coefficient for Store E may be determined to be a plus one size difference based on the size twelve tank top of Store B and size thirteen tank top of Store E. Based on the change coefficient, Store E may be correlated to Store A (branch 402A) and store C (branch 402C) based on the relationships between Store B and Stores A and C and the change coefficient between Store B and Store E being a plus one size.

According to an implementation, one or more other size profiles may be updated to include Store E based on the relative relationships between Store E and the stores in size profile 402. The one or more other size profiles may be updated with respective change coefficients for Store E in a manner similar to how the one or more other size profiles may be correlated with the relationships between Stores A, B, and C of size profile 402. The change coefficients associated with Store E may be updated as size nodes for one or more other buyers include data associated with Store E. Based on the updated size profiles, at step 308, a buyer may be matched to an updated size profile, in accordance with the techniques disclosed herein. For example, steps 310-314, as disclosed herein, may be implemented based on the updated size profiles.

At step 314 of flowchart 300 of FIG. 3, the size code identified at step 312 may be output. The size code may be output via extension 120. Extension 120 may interact with the given platform that provides the first item at step 310. For example, extension 120 may provide the size code to the given platform, may modify code (e.g., source code, metadata, index, etc.) associated with the given platform, or the like. Alternatively, or in addition, extension 120 may generate a notification (e.g., a pop-up, a message, an electronic mail message, etc.) including the size code and may cause the notification to be provided to the buyer.

According to an implementation, the size code may be a size agnostic size code. For example, the size code may be an indicator (e.g., a symbol, a term such as "My Size", a non-size specific value) such that the buyer only views the indicator instead of a size (e.g., a size associated with a corresponding item entity). Accordingly, a buyer may not experience any negative psychological effects associated with certain sizes, as may be pre-determined by item entities. Size engine 130 and/or extension 120 may mask item entity related size or fit information and may replace such information with the indicator. Such masking may be implemented by, for example, modifying code (e.g., source code, metadata, index, etc.) associated with the given platform, overlaying item entity sizes with the indicator, or the like.

Figure 5:
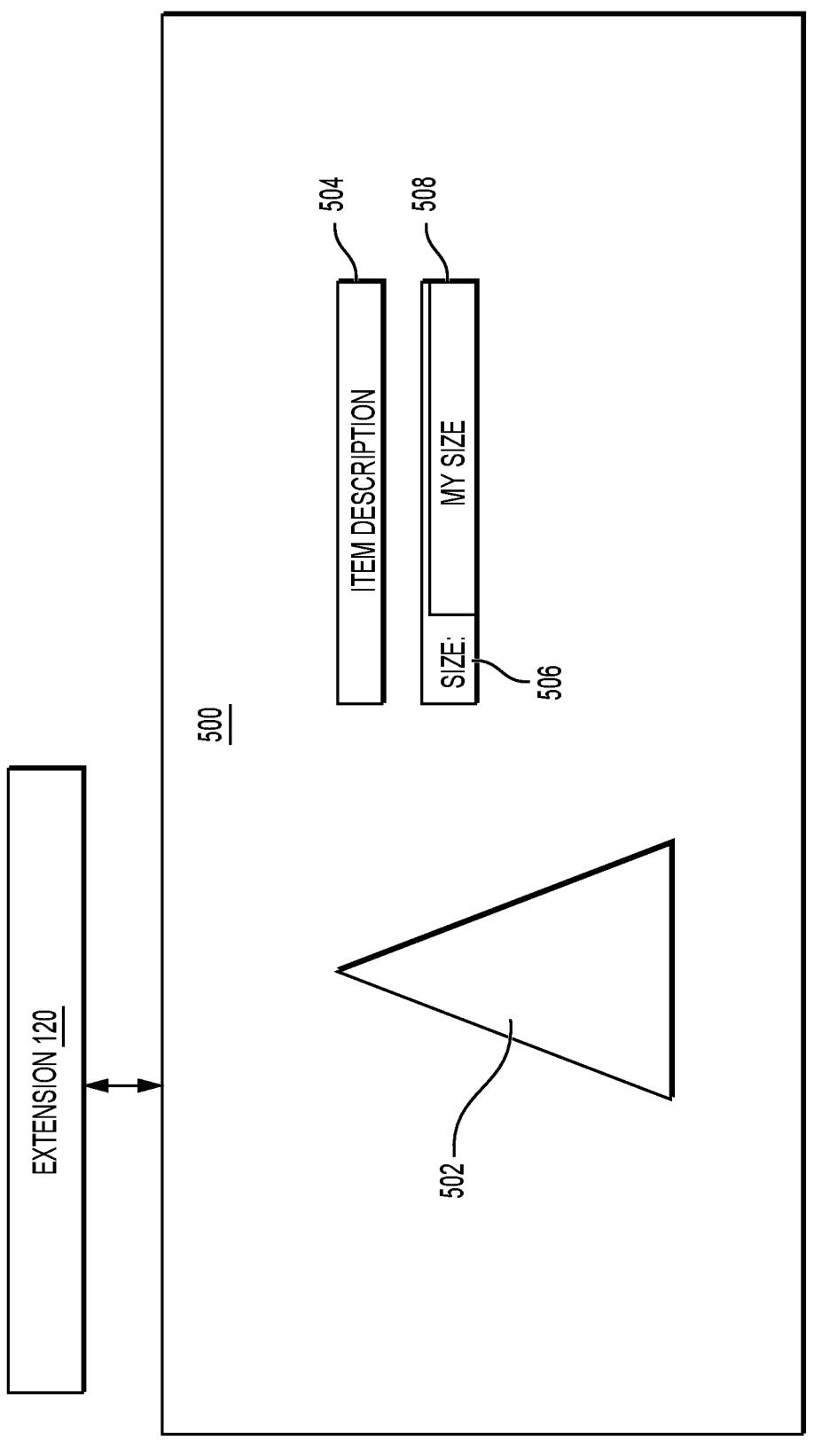
FIG. 5 depicts a diagram for a platform interface, according to one or more embodiments.

For example, as depicted in FIG. 5, an extension 120 may operate in the background of a platform interface 500 (a GUI). Platform interface 500 may be a checkout page for an item 502 for a respective item entity. An item description 504 may be provided proximate to item 502. Extension 120 may output the size code at step 314 of flowchart 300 of FIG. 3 for item 502, in accordance with the techniques disclosed herein. Platform interface 500 may include an item size 506, a portion of which may be overlaid with indicator 508 to display "My Size." Extension 120 may cause the overlaid indicator 508 to be displayed over the portion of item size 506 by identifying the item size 506 interface component (e.g., via optical character recognition, code analysis, detection of a marker associated with sizes, etc.).

Figure 6:
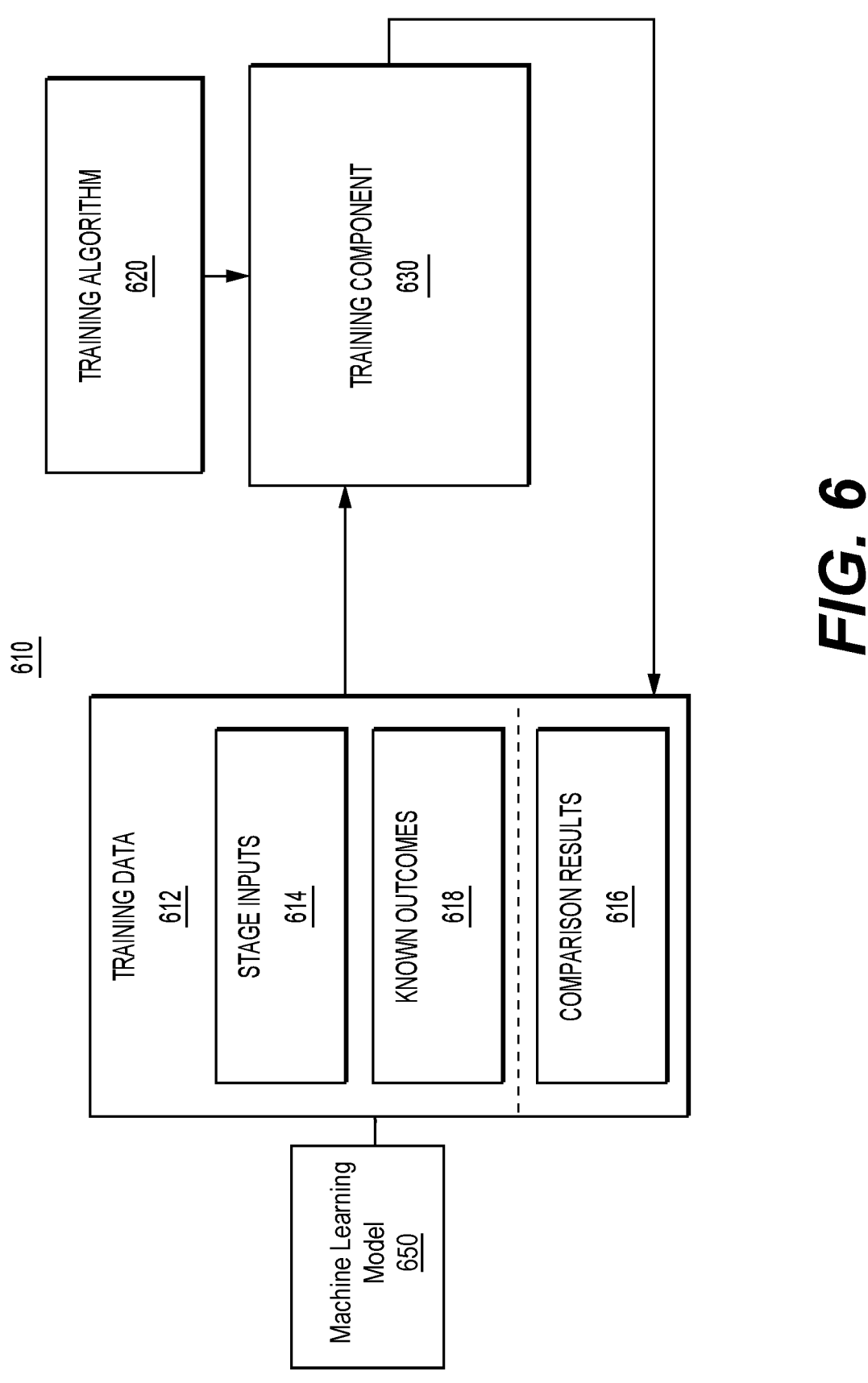
FIG. 6 depicts a flow diagram for training a machine learning model, according to one or more embodiments.

As discussed, one or more implementations disclosed herein may be applied by using a machine learning model. A machine learning model as disclosed herein may be trained using the system systems, components, techniques, or the like associated with FIGS. 1-5 disclosed herein. As shown in flow diagram 610 of FIG. 6, training data 612 may include one or more of stage inputs 614 and known outcomes 618 related to a machine learning model to be trained. The stage inputs 614 may be from any applicable source including a component or set shown in FIGS. 1-5. The known outcomes 618 may be included for machine learning models generated based on supervised or semi-supervised training. An unsupervised machine learning model might not be trained using known outcomes 618. Known outcomes 618 may include known or desired outputs for future inputs similar to or in the same category as stage inputs 614 that do not have corresponding known outputs.

The training data 612 and a training algorithm 620 may be provided to a training component 630 that may apply the training data 612 to the training algorithm 620 to generate a trained machine learning model 650. According to an implementation, the training component 630 may be provided comparison results 616 that compare a previous output of the corresponding machine learning model to apply the previous result to re-train the machine learning model. The comparison results 616 may be used by the training component 630 to update the corresponding machine learning model. The training algorithm 620 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like. The output of the flow diagram 610 may be a trained machine learning model 650.

It should be understood that embodiments in this disclosure are exemplary only, and that other embodiments may include various combinations of features from other embodiments, as well as additional or fewer features.

In general, any process or operation discussed in this disclosure that is understood to be computer-implementable, such as those discussed in reference to FIGS. 1-6, may be performed by one or more processors of a computer system. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices disclosed in or disclosed in relation to FIGS. 1-6. One or more processors of a computer system may be included in a single computing device or distributed among a plurality of computing devices. A memory of the computer system may include the respective memory of each computing device of the plurality of computing devices.

Figure 7:
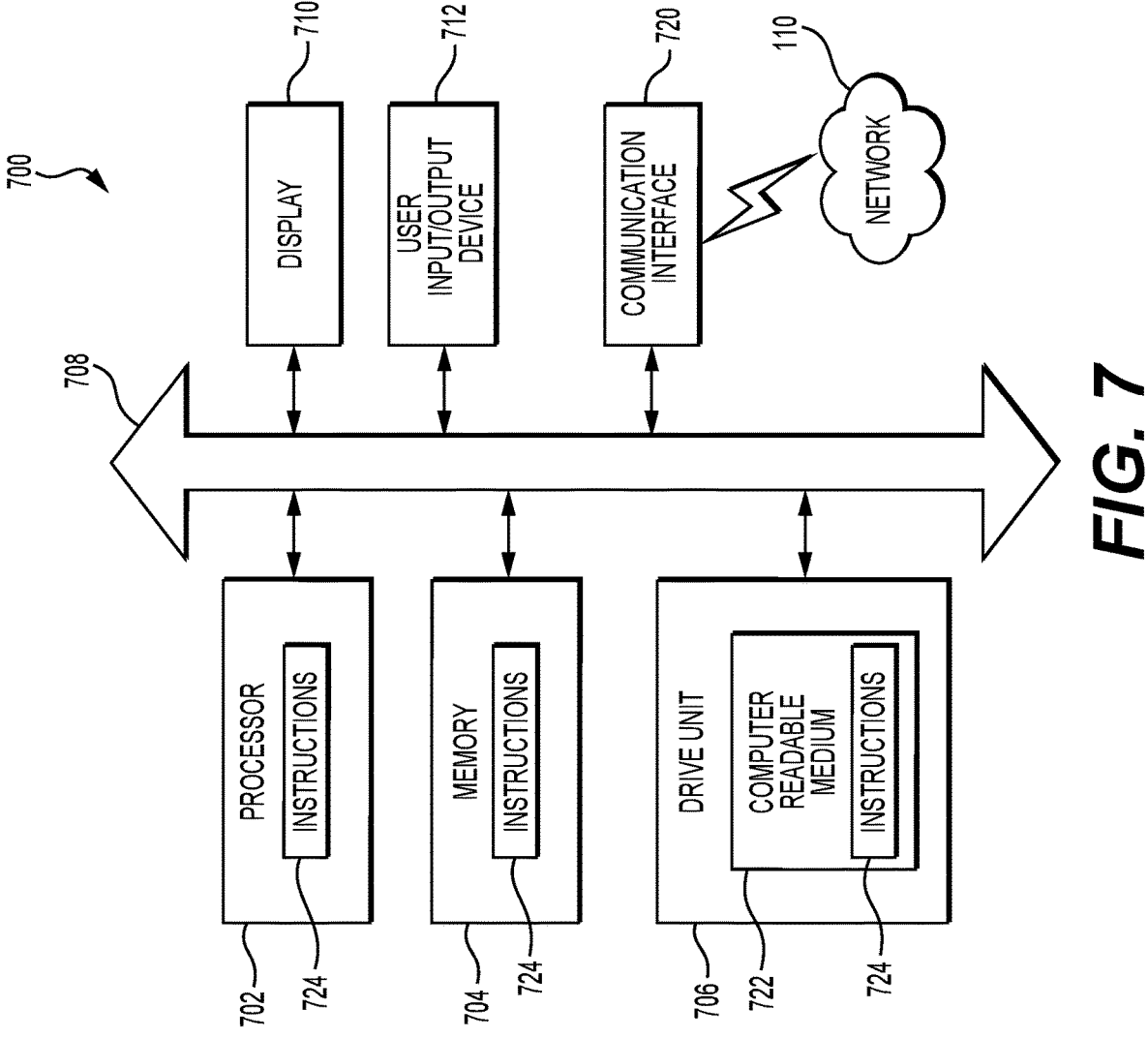
FIG. 7 depicts an example of a computing device, according to one or more embodiments.

FIG. 7 is a simplified functional block diagram of a computer 700 that may be configured as a device for executing the systems and/or techniques of FIGS. 1-6, according to exemplary embodiments of the present disclosure. For example, the computer 700 may be configured as a system according to exemplary embodiments of this disclosure. In various embodiments, any of the systems herein may be a computer 700 including, for example, a data communication interface 720 for packet data communication. The computer 700 also may include a central processing unit ("CPU") 702, in the form of one or more processors, for executing program instructions. The computer 700 may include an internal communication bus 708, and a storage unit 706 (such as ROM, HDD, SDD, etc.) that may store data on a computer readable medium 722, although the computer 700 may receive programming and data via network communications. The computer 700 may also have a memory 704 (such as RAM) storing instructions 724 for executing techniques presented herein, although the instructions 724 may be stored temporarily or permanently within other modules of computer 700 (e.g., processor 702 and/or computer readable medium 722). The computer 700 also may include input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for outputting a size code from a managed database of size codes by a size engine, the method comprising:
   receiving, via an extension associated with a user device, a plurality of size nodes for a plurality of users, the plurality of size nodes including at least one of incoming size nodes or outgoing size nodes for one or more items, the one or more items each corresponding to respective item entities, the plurality of size nodes having been generated based on a plurality of interactions monitored by the extension,
      wherein the plurality of user interactions are associated with the plurality of users across a plurality of respective extensions;
   generating, via a trained machine learning model, a plurality of size profiles based on the plurality of size nodes, wherein:
      each of the plurality of size profiles include a unique variation of the plurality of size nodes for the respective item entities,
      the plurality of size profiles each correlate a size for each item entity to each other item entity of the respective item entities, and
      the trained machine learning model has been trained to predict a size profile based on a plurality of training size nodes and a plurality of training inter-node relationships;
   receiving first user size nodes for a first user;
   matching the first user to a first size profile of the plurality of size profiles based on the first user size nodes;
   receiving a first item corresponding to a first item entity of the item entities;
   identifying, at the size engine, the size code for the first item based on the first size profile; and
   outputting, via a graphical user interface (GUI) associated with the user device, the size code.

2. The method of claim 1, wherein the plurality of size nodes are received at one or more extensions.

3. The method of claim 2, wherein the one or more extensions are configured to receive the plurality of size nodes from a respective plurality of point-of-sale portals corresponding to the item entities.

4. The method of claim 3, wherein each of the plurality of point-of-sale portals correspond to one or more of a Uniform Resource Locator (URL), a domain, a device application, or a marketplace.

5. The method of claim 2, wherein the one or more extensions receive the plurality of size nodes from a respective point-of-sale portal Application Programming Interface (API).

6. The method of claim 2, wherein the size code is output via one of the one or more extensions on the user device.

7. The method of claim 1, wherein each of the plurality of size nodes includes one or more of an item size, an item fit, an item feedback, an outgoing feedback for a respective item entity, or a re-buy item size.

8. The method of claim 1, wherein the plurality of size nodes is received from user inputs.

9. The method of claim 1, wherein the outgoing size nodes includes a null outgoing marker.

10. The method of claim 1, further comprising determining a correlation score for the first size profile, wherein the first size profile is matched to the first user based on the correlation score being above a minimum correlation score.

11. The method of claim 1, wherein at least one of the plurality of size profiles or the matching the first user to the first size profile is implemented using a vector based machine learning model.

12. A system comprising:

a size engine;

an extension associated with a user device;

a data storage device storing processor-readable instructions; and a processor operatively connected to the data storage device and the size engine, and configured to execute the processor-readable instructions to perform operations that include:

receiving, via the extension, a plurality of size nodes for a plurality of users, the plurality of size nodes including at least one of incoming size nodes or outgoing size nodes for one or more items, the one or more items each corresponding to respective item entities;

generating, via a trained machine learning model, a plurality of size profiles based on the plurality of size nodes, wherein each of the plurality of size profiles include a unique variation of the plurality of size nodes for the item entities, wherein the plurality of size profiles each correlate a size for each item entity to each other item entity of the item entities, wherein the trained machine learning model has been trained to predict a size profile based on a plurality of training size nodes and a plurality of training inter-node relationships;

receiving a first user size nodes for a first user;

matching the first user to a first size profile of the plurality of size profiles based on the first user size nodes;

receiving a first item corresponding to a first item entity of the item entities;

generating, at the size engine, a size code for the first item based on the first size profile; and outputting, via a graphical user interface (GUI) associated with the user device, the size code.

13. The system of claim 12, wherein:

the plurality of size nodes have been generated based on a plurality of interactions monitored by the extension, and the plurality of interactions are associated with the plurality of users across a plurality of respective extensions.

14. The system of claim 13, wherein the plurality of respective extensions are configured to receive the plurality of size nodes from a respective plurality of point-of-sale portals corresponding to the item entities.

15. The system of claim 12, wherein the outgoing size nodes include a null outgoing marker.

16. A method for outputting a size code from a managed database of size codes by a size engine, the method comprising:

receiving, via an extension associated with a user device, a plurality of size nodes for a plurality of users, the plurality of size nodes having been generated by:

monitoring, via the extension, a plurality of user interactions associated with a plurality of item actions across a plurality of respective extensions, and generating, via the extension, the plurality of size nodes for the plurality of users based on the plurality of interactions, the plurality of size nodes including at least one of incoming size nodes or outgoing size nodes for one or more items, the one or more items each corresponding to respective item entities;

receiving, via the extension, a plurality of size profiles based on the plurality of size nodes, wherein:

each of the plurality of size profiles include a unique variation of the plurality of size nodes for the respective item entities, and the plurality of size profiles each correlate a size for each item entity to each other item entity of the respective item entities;

receiving first user size nodes for a first user;

matching the first user to a first size profile of the plurality of size profiles based on the first user size nodes;

receiving a first item corresponding to a first item entity of the item entities;

identifying, at the size engine, the size code for the first item based on the first size profile; and outputting, via a graphical user interface (GUI) associated with the user device, the size code.

17. The method of claim 16, wherein the item actions include accessing an item page, adding an item to a virtual cart, adding the item to a wish list, or requesting the size code.

18. The method of claim 16, wherein each of the plurality of size nodes includes one or more of an item size, an item fit, an item feedback, an outgoing feedback for a respective item entity, or a re-buy item size.

19. The method of claim 18, further comprising:

receiving a new size node for a new item entity, the new item entity being different than the item entities;

determining a change coefficient for the new item entity based on the new size node and the plurality of size nodes; and generating, at the size engine, a plurality of updated size profiles by updating the plurality of size profiles to include the new item entity based on the change coefficient for the new item entity.

20. The method of claim 16, further comprising:

generating, via a trained machine learning model, the plurality of size profiles based on the plurality of size nodes, the trained machine learning model having been trained to predict a size profile based on a plurality of training size nodes and a plurality of training inter-node relationships.

* * * * *